United States Patent
Peters et al.

(10) Patent No.: US 10,393,374 B2
(45) Date of Patent: Aug. 27, 2019

(54) PROCESS FOR THE INCINERATION OF ACTIVATED COAL-SUPPORTED PGM CATALYSTS

(71) Applicants: Heraeus Deutschland GmbH & Co. KG, Hanau (DE); Heraeus Precious Metals North America LLC, Santa Fe Springs, CA (US)

(72) Inventors: Brian Peters, Wartburg, TN (US); Chris Hobbs, Knoxville, TN (US); Todd England, Sunbright, TN (US); Jimmy Taylor, Sunbright, TN (US); Holger Winkler, Darmstadt (DE); Bernhard Bauer-Siebenlist, Aschaffenburg (DE)

(73) Assignees: HERAEUS DEUTSCHLAND & GMBH & CO. KG, Hanau (DE); HERAEUS PRECIOUS METALS NORTH AMERICA LLC, Santa Fe Springs, CA (US)

( * ) Notice: Subject to any disclaimer, the term of this patent is extended or adjusted under 35 U.S.C. 154(b) by 65 days.

(21) Appl. No.: 15/899,474

(22) Filed: Feb. 20, 2018

(65) Prior Publication Data
US 2018/0238542 A1 Aug. 23, 2018

Related U.S. Application Data

(60) Provisional application No. 62/460,561, filed on Feb. 17, 2017.

(51) Int. Cl.
| | | |
|---|---|---|
| *B01J 38/12* | (2006.01) |
| *F23G 5/50* | (2006.01) |
| *F23G 7/00* | (2006.01) |
| *B01J 23/40* | (2006.01) |
| *B01J 21/12* | (2006.01) |
| *B01J 37/02* | (2006.01) |
| *C01B 32/30* | (2017.01) |
| *B01J 35/00* | (2006.01) |
| *C22B 7/00* | (2006.01) |
| *C22B 11/02* | (2006.01) |

(52) U.S. Cl.
CPC ........... *F23G 5/50* (2013.01); *B01J 21/12* (2013.01); *B01J 23/40* (2013.01); *B01J 35/002* (2013.01); *B01J 37/0244* (2013.01); *C01B 32/30* (2017.08); *C22B 7/001* (2013.01); *C22B 11/026* (2013.01); *F23G 7/003* (2013.01); *F23G 2207/30* (2013.01); *F23G 2900/70* (2013.01); *Y02P 10/214* (2015.11)

(58) Field of Classification Search
CPC . B01J 21/12; B01J 23/40; B01J 35/002; B01J 38/12; F23G 2202/60; F23G 7/003; F23G 2900/70; C22B 11/026; Y02P 10/214; F27D 2019/0078
USPC ........... 502/38, 41, 185, 326; 432/13, 14, 17
See application file for complete search history.

(56) References Cited

U.S. PATENT DOCUMENTS

| | | | | |
|---|---|---|---|---|
| 2,456,707 A | * | 12/1948 | Percival | B01J 38/12 208/150 |
| 2,462,193 A | * | 2/1949 | Hulsberg | B01J 8/005 159/DIG. 3 |
| 2,985,584 A | * | 5/1961 | Rabo | B01J 21/20 208/120.01 |
| 3,055,824 A | * | 9/1962 | Squires, Jr. | B01J 23/94 208/212 |
| 8,188,329 B2 | * | 5/2012 | Nowottny | C22B 7/001 110/185 |
| 8,377,382 B2 | * | 2/2013 | Nowottny | C22B 7/001 110/185 |

FOREIGN PATENT DOCUMENTS

| | | | | |
|---|---|---|---|---|
| EP | 1 321 534 | * | 6/2003 | C22B 3/20 |
| WO | WO-2007036334 A2 | | 4/2007 | |
| WO | 2018/152484 | * | 8/2018 | C22B 7/00 |

OTHER PUBLICATIONS

Written Opinion for WO 2018/152484 (Year: 2018).*

* cited by examiner

*Primary Examiner* — Patricia L. Hailey
(74) *Attorney, Agent, or Firm* — Blank Rome LLP

(57) ABSTRACT

A process for the incineration of activated coal-supported PGM catalysts, the process comprising a joint incineration of a multilayer arrangement, wherein the multilayer arrangement includes (i) a top layer of particulate activated coal-supported PGM catalyst, (ii) a layer of coarse charcoal located beneath said top layer and, optionally, (iii) a layer of particulate coke located beneath the charcoal layer, and wherein an upward flow of oxidizing gas is homogeneously passed through said multilayer arrangement during the incineration.

15 Claims, No Drawings

PROCESS FOR THE INCINERATION OF ACTIVATED COAL-SUPPORTED PGM CATALYSTS

CROSS REFERENCE TO RELATED APPLICATION

This application claims the benefit of U.S. Provisional Application No. 62/460,561, filed Feb. 17, 2017, which is incorporated by reference herein in its entirety.

DETAILED DESCRIPTION

The term "PGM(s)," as used throughout this disclosure and in the claims, shall mean one or more platinum group metals selected from the group consisting of ruthenium, rhodium, palladium, osmium, iridium and platinum, and in particular, selected from the group consisting of palladium and platinum.

The invention relates to processes for the incineration of activated coal-supported PGM catalysts, and in particular, exhausted (spent) activated coal-supported PGM catalysts.

The term "activated coal-supported PGM catalyst," as used throughout this disclosure and in the claims, shall mean a heterogeneous catalyst comprising an activated coal-support (activated coal-carrier, a support or carrier made of activated coal) equipped with one or more catalytically active PGMs. The activated coal-support comprises or consists of activated carbon (activated coal, active coal). The activated carbon may originate from various natural sources, for example, activated carbon from wood, peat or coconut shells. The one or more PGMs may be present on the inner and/or on the outer surface of the activated carbon in elemental form and/or in the form of one or more PGM compounds such as, for example, PGM oxides. The total PGM content of such activated coal-supported PGM catalyst may lie in the range of, for example, 0.1 to 5 wt.-% (weight-%), in particular 0.1 to 1 wt.-%. Such activated coal-supported PGM catalysts are well known to the person skilled in the art. They are used in various industrial chemical processes, in particular, in industrial hydrogenation processes.

The incineration of activated coal-supported PGM catalysts is well known as a measure for PGM enrichment, by essentially burning off the supporting activated carbon. For example, International Patent Publication No. WO 2007/036334 discloses such an incineration process.

In this disclosure, a distinction is made between combustible activated coal-supported PGM catalysts and minimally combustible activated coal-supported PGM catalysts.

Combustible activated coal-supported PGM catalysts have a support of activated carbon which has an incineration behavior characterized by a weight loss of 50% after 25 to 28 minutes, wherein the weight loss is determined by TGA (thermogravimetric analysis) of a small (about 8 to 16 mg) powder sample of the respective activated carbon in air atmosphere with a start temperature of 200° C. and at a heating rate of 20° C. per minute. The 100% start weight of about 8 to 16 mg is determined at the start temperature of 200° C. Activated carbons from wood or peat are examples of activated carbon having such incineration behavior. Examples include commercially available activated carbon types, such as Norit® SX Plus manufactured by Cabot Corporation of Alpharetta, Ga. and Acticarbone® 3S and Acticarbone® CXV manufactured by Calgon Carbon Corporation of Moon Township, Pa.

Minimally combustible activated coal-supported PGM catalysts, on the other hand, have a support of activated carbon which has poor incineration behavior, which may be characterized by a weight loss of 50% after >28 minutes, for example, >28 to 35 minutes, wherein the weight loss is determined by the same TGA measurement method and under the same conditions as disclosed in the preceding paragraph. In case weight loss of 50% takes more than 35 minutes, the temperature is kept at and not raised above 800° C. Activated carbon from coconut shells is an example of such type of activated carbon with a poor incineration behavior (as defined above). Examples include commercially available activated carbon types, such as Desorex® C33 spezial and Carbopal® CCP 90 FF spezial, both manufactured by Donau Carbon GmbH of Frankfurt, Germany.

There is a desire for an improved process for the incineration of activated coal-supported PGM catalysts, and in particular for the incineration of minimally combustible activated coal-supported PGM catalysts. In the latter case, the standard procedure of simply burning off the carbon of an activated coal-supported PGM catalyst within a chamber furnace may take too much time and may be ineffective, i.e. the removal of carbon may be undesirably insufficient. This increases processing time and thus costs.

It has been found that the aforementioned desire can be achieved by the process set forth herein.

The process of the invention is an incineration process. It is a process for the incineration of activated coal-supported PGM catalysts, characterized by jointly incinerating a multilayer arrangement comprising: (i) a top layer of particulate activated coal-supported PGM catalyst, (ii) a layer of coarse charcoal located beneath said top layer and, optionally, (iii) a layer of particulate coke located beneath the charcoal layer, wherein an upward flow of oxidizing gas is homogeneously passed through said multilayer arrangement during the incineration.

Top layer of particulate activated coal-supported PGM catalyst

The particulate activated coal-supported PGM catalyst of said top layer may comprise one or more activated coal-supported PGM catalysts. The particulate activated coal-supported PGM catalyst may comprise particles of, for example, 2 mm to 2 cm measured in the longest dimension. The thickness of the top layer prior to the incineration may lie in the range of, for example, 30 to 100 cm.

In an embodiment, the particulate activated coal-supported PGM catalyst comprises one or more PGMs, in particular, platinum, palladium, rhodium, or combinations thereof. The total PGM content of the particulate activated coal-supported PGM catalyst may lie in the range of, for example, 0.1 to 5 wt.-%, in particular 0.1 to 1 wt.-%. Apart from the activated carbon and the PGM, the particulate activated coal-supported PGM catalyst may comprise, for example, 0 to 3 wt.-% of aluminum oxide and/or silicon dioxide. In an embodiment, the particulate activated coal-supported PGM catalyst comprises or is an exhausted catalyst. In a particular embodiment, the particulate activated coal-supported PGM catalyst comprises or is a minimally combustible activated coal-supported PGM catalyst and/or an exhausted minimally combustible activated coal-supported PGM catalyst.

In an embodiment, the particulate activated coal-supported PGM catalyst comprises or is an exhausted minimally combustible particulate activated coal-supported palladium catalyst which originates from a PTA production process (purified terephthalic acid production process). The well-known PTA production process involves catalytic hydrogenation of impurities in crude terephthalic acid and, typically, an activated coal-supported palladium catalyst is employed in said process.

Coarse Charcoal Layer

The coarse charcoal of the layer beneath the top layer may comprise particles of charcoal having a particle size of, for example, 2 to 8 cm measured in the longest dimension. The thickness of the layer of coarse charcoal prior to the incineration may lie in the range of, for example, 5 to 20 cm.

Particulate Coke Layer

The layer of particulate coke beneath the charcoal layer may comprise particles and/or pieces of particulate coke that are smaller than the charcoal particles/pieces. It may comprise pieces of particulate coke having a particle size of, for example, 0.5 to 2.5 cm measured in the longest dimension. The thickness of the layer of particulate coke prior to the incineration may lie in the range of, for example, 5 to 20 cm.

In one embodiment, the layer of particulate coke is optional. In a preferred embodiment, however, the layer of particulate coke is present in the multilayer arrangement.

Incineration Process

In the process of the invention, an upward flow of oxidizing gas is homogeneously passed through the multilayer arrangement during the incineration. In other words, the flow of oxidizing gas is an upward homogeneous flow passing through the entire multilayer arrangement during the incineration. Specifically, it is passed from beneath the multilayer arrangement and through the multilayer arrangement during the incineration step in a way that prevents the formation of channels of oxidizing gas within the multilayer arrangement. Preferably, the oxidizing gas is passed through the multilayer arrangement in a way that prevents the formation of oxidizing gas channels within the multilayer arrangement as a whole or within any of its individual layers. The upward flow of oxidizing gas is adjusted so as to prevent swirling of the multilayer arrangement, of its layers, and of any of its components. The flow rate of the oxidizing gas, at a pressure of about 1.1 bar, may lie in the range of, for example, 500 to 1000 liters per hour and per kg of particulate activated coal-supported PGM catalyst.

The oxidizing gas may be air or oxygen-enriched air with an oxygen content of, for example, up to 50 vol.-%.

The process of the invention may be performed in a furnace, for example, a stainless steel furnace. Such furnace may have a cylindrical shape. Its hearth may be, for example, 1 to 3 meters high with a diameter in the range of, for example, 0.5 to 2 meters. The furnace may have an exhaust at its top and it may also have a cooling means, for example, an air or water cooling ring at its wall. The furnace may comprise a mechanical means which carries the multilayer arrangement during the incineration process. In one embodiment, such mechanical means is situated beneath the multilayer arrangement. The mechanical means is designed to prevent any material from above the mechanical means, such as any part of the multilayer arrangement, to drop through the mechanical means, whereas the homogeneous upward flow of oxidizing gas rising from below and passing through the entire multilayer arrangement during the incineration is not obstructed. The material that is prevented from dropping through the mechanical means includes particulate activated coal-supported PGM catalyst, coarse charcoal and, if present, particulate coke, as well as PGM enriched ash which is formed in the course of the incineration process. Specifically PGM enriched ash is the product obtained after conclusion of the incineration process of the invention. In one embodiment, the mechanical means may support or ensure homogeneity of the upward oxidizing gas flow. The mechanical means may comprise a multi-layered arrangement of plates having pores, gauzes of appropriate mesh size, sieves having openings like holes, slits, or any combination thereof. For example, typical pore diameters may lie in the range of, for example, 1 to 3 mm. Typical mesh sizes may lie in the range of, for example, 50 to 300 μm. Beneath the mechanical means, there is a hollow space defined by the furnace wall and furnace bottom.

The oxidizing gas flow may be upwardly passed from the hollow space through the mechanical means and the multilayer arrangement during the incineration. The oxidizing gas may be supplied from outside of the furnace into the hollow space. In one embodiment, a nozzle floor or a gas coil may be positioned within the hollow space as means for providing the oxidizing gas. Employment of a nozzle floor or gas coil may support or ensure homogeneity of the oxidizing gas flow. The gas coil may have the form of a spiral tube with upwardly directed holes or bores which function as outlets for the oxidizing gas. The oxidizing gas pressure within the gas coil may be inhomogeneous, as there may be a gas pressure decrease at increasing distances relative to the oxidizing gas inlet of the gas coil. As such, in one preferred embodiment, the diameter of the holes may be varied, and/or the distance between the holes may be varied, in order to homogenize the flow of oxidizing gas out of the gas coil's holes.

The furnace may comprise a port for a gas lance to enable an additional and supporting local and/or temporary supply of the oxidizing gas, or even oxygen into the hollow space or into the multilayer arrangement, if desired.

The incineration process may be started by igniting and burning the multilayer arrangement with a gas flame, optionally initially supported by way of a gas lance, if desired. The incineration process may be performed at an incineration temperature in the range of, for example, 600 to 850° C. The incineration temperature can be adjusted by varying one or more of the following parameters: flow rate of the oxidizing gas, oxygen content of the oxidizing gas, and use or non-use of the oxidizing gas lance. The incineration process may be performed batch-wise, meaning that it may be performed as a batch process. In the alternative, it may be carried out as a semi-continuous process in the course of which the top layer of particulate activated coal-supported PGM catalyst may be replenished by feeding the catalyst material to be burned from above. Feeding from above may be effected, for example, by means of an arrangement comprising a feed hopper, a vibratory chute, and a shutter connected to the furnace wall at the top of the furnace.

The incineration process of the invention is targeted at the enrichment of the PGMs comprised by the activated coal-supported PGM catalyst. After conclusion of the incineration, a PGM enriched ash remains as product of the incineration process. Compared to the total PGM content of the activated coal-supported PGM catalyst, the ash has a remarkably enriched total PGM content, even when the process has been performed with activated coal-supported PGM catalyst of the minimally combustible type. The ash may comprise, for example, 3 to 90 wt.-% of PGM in elemental form and/or in the form of one or more chemical compounds, for example, PGM oxides. In embodiments, the PGM content in the ash may even exceed 90 wt.-% and it may be in the range of, for example, 3 to 99 wt.-%. The PGM type and content may be determined by X-ray fluorescence (XRF). The ash may further comprise a small residual amount of unburnt carbon, for example, 0.5 to 10 wt.-%; 0 to 80 wt.-% of aluminum oxide and/or silicon dioxide; and 0 to 10 wt.-% of other oxides (oxides other than PGM oxides, aluminum oxide and silicon dioxide).

The ash obtained after conclusion of the incineration process may be transferred to further processing targeted at PGM recycling. Examples of such further processing include, but are not limited to, pyrometallurgical and/or hydrometallurgical processing as is conventional and well-known in the art.

The incineration process of the invention can be used to incinerate any kind of activated coal-supported PGM catalyst or exhausted activated coal-supported PGM catalyst. However, the full advantage of the process of the invention may be achieved when the process is used for the incineration of minimally combustible activated coal-supported PGM catalyst or exhausted minimally combustible activated coal-supported PGM catalyst. It is believed that in the latter case of incinerating a minimally combustible activated coal-supported PGM catalyst, it is advantageous to employ a combination of the following in the process of the invention: (a) using additional fuel in the form of the charcoal and optional coke, and (b) employing the upward homogeneous flow of the oxidizing gas.

STATEMENTS OF THE DISCLOSURE

Statement of the Disclosure include:

Statement 1: A process for the incineration of activated coal-supported PGM catalysts, the process comprising a joint incineration of a multilayer arrangement, wherein the multilayer arrangement comprises (i) a top layer of particulate activated coal-supported PGM catalyst, (ii) a layer of coarse charcoal located beneath said top layer and, optionally, (iii) a layer of particulate coke located beneath the charcoal layer, and wherein an upward flow of oxidizing gas is homogeneously passed through said multilayer arrangement during the incineration.

Statement 2: A process according to Statement 1, wherein the particulate activated coal-supported PGM catalyst comprises one or more activated coal-supported PGM catalysts.

Statement 3: A process according to Statement 1 or 2, wherein the particulate activated coal-supported PGM catalyst comprises particles of 2 mm to 2 cm measured in the longest dimension.

Statement 4: A process according to any one of Statements 1-3, wherein the thickness of the top layer prior to the incineration lies in the range of 30 to 100 cm.

Statement 5: A process according to any one of Statements 1-4, wherein a total PGM content of the particulate activated coal-supported PGM catalyst lies in the range of 0.1 to 5 wt.-%.

Statement 6: A process according to any one of Statements 1-5, wherein the particulate activated coal-supported PGM catalyst comprises 0 to 3 wt.-% of aluminum oxide and/or silicon dioxide.

Statement 7: A process according to any one of Statements 1-6, wherein the particulate activated coal-supported PGM catalyst comprises an exhausted catalyst.

Statement 8: A process according to any one of Statements 1-7, wherein the particulate activated coal-supported PGM catalyst comprises a minimally combustible activated coal-supported PGM catalyst.

Statement 9: A process according to any one of Statements 1-8, wherein the coarse charcoal of the layer beneath the top layer comprises pieces of 2 to 8 cm measured in the longest dimension.

Statement 10: A process according to any one of Statements 1-9, wherein the thickness of the layer of coarse charcoal prior to the incineration lies in the range of 5 to 20 cm.

Statement 11: A process according to any one of Statements 1-10, wherein the particulate coke comprises pieces of 0.5 to 2.5 cm measured in the longest dimension.

Statement 12: A process according to any one of Statements 1-11, wherein a thickness of the layer of particulate coke prior to the incineration lies in the range of 5 to 20 cm.

Statement 13: A process according to any one of Statements 1-12, wherein the flow rate of the oxidizing gas at a pressure of about 1.1 bar lies in the range of 500 to 1000 liters per hour and per kg of particulate activated coal-supported PGM catalyst.

Statement 14: A process according to any one of Statements 1-13, wherein the oxidizing gas is air or oxygen-enriched air with an oxygen content of up to 50 vol.-%.

Statement 15: A process according to any one of Statements 1-14, wherein the incineration is performed at an incineration temperature in the range of 600 to 850° C.

EXAMPLES

Example 1 (according to the invention): A 10 cm thick base layer of charcoal having a particle size of 5 cm measured in the longest dimension was introduced into a vertical cylindrical furnace with a height of 1 meter and a diameter of 0.5 meters. The base layer was overlayed with a 50 cm thick top layer of a coal-supported palladium catalyst (particles of 5 mm measured in the longest dimension, coal support: Norit® SX Plus; Pd content 1 wt.-%).

An upward flow of oxygen-enriched air having an oxygen content of 30 vol-% was homogeneously passed through the double layer at a flow rate of 700 liters per hour making use of a gas coil. The incineration process was started by burning the two-layer arrangement with a gas flame. The incineration at 800 ° C. took 6 hours.

After cooling down to room temperature the ash so obtained was homogenized and analyzed for unburned carbon and palladium.

Result: unburned carbon: 2 wt.-%, Pd: 97 wt.-%

Example 2 (according to the invention): Example 1 was repeated with the only difference that the coal support was Desorex® C33 spezial instead of Norit® SX Plus.

Result: unburned carbon: 9 wt.-%, Pd: 90 wt.-%

Comparative Example 3: A 10 cm thick layer of a coal-supported palladium catalyst (particles of 5 mm measured in the longest dimension, coal support: Norit® SX Plus; Pd content 1 wt.-%) was introduced into a tray and incinerated within a chamber furnace. The incineration process was started by burning the material with a gas flame. The incineration at 800 ° C. took 6 hours.

After cooling down to room temperature the ash so obtained was homogenized and analyzed for unburned carbon and palladium.

Result: unburned carbon: 4 wt.-%, Pd: 95 wt.-%

Comparative Example 4: Comparative Example 3 was repeated with the only difference that the coal support was Desorex® C33 spezial instead of Norit® SX Plus.

Result: unburned carbon: 89 wt.-%, Pd: 10 wt.-%

The invention claimed is:

1. A process for the incineration of activated coal-supported PGM catalysts, the process comprising a joint incineration of a multilayer arrangement,
wherein the multilayer arrangement comprises (i) a top layer of particulate activated coal-supported PGM catalyst, (ii) a layer of coarse charcoal located beneath said top layer and, optionally, (iii) a layer of particulate coke located beneath the charcoal layer, and wherein an upward flow of oxidizing gas is homogeneously passed through said multilayer arrangement during the incineration.

2. The process of claim 1, wherein the particulate activated coal-supported PGM catalyst comprises one or more activated coal-supported PGM catalysts.

3. The process of claim 1, wherein the particulate activated coal-supported PGM catalyst comprises particles of 2 mm to 2 cm measured in the longest dimension.

4. The process of claim 1, wherein the thickness of the top layer prior to the incineration lies in the range of 30 to 100 cm.

5. The process of claim 1, wherein a total PGM content of the particulate activated coal-supported PGM catalyst lies in the range of 0.1 to 5 wt.-%.

6. The process of claim 1, wherein the particulate activated coal-supported PGM catalyst comprises 0 to 3 wt.-% of aluminum oxide and/or silicon dioxide.

7. The process of claim 1, wherein the particulate activated coal-supported PGM catalyst comprises an exhausted catalyst.

8. The process of claim 1, wherein the particulate activated coal-supported PGM catalyst comprises a minimally combustible activated coal-supported PGM catalyst.

9. The process of claim 1, wherein the coarse charcoal of the layer beneath the top layer comprises pieces of 2 to 8 cm measured in the longest dimension.

10. The process of claim 1, wherein the thickness of the layer of coarse charcoal prior to the incineration lies in the range of 5 to 20 cm.

11. The process of claim 1, wherein the particulate coke comprises pieces of 0.5 to 2.5 cm measured in the longest dimension.

12. The process of claim 1, wherein a thickness of the layer of particulate coke prior to the incineration lies in the range of 5 to 20 cm.

13. The process of claim 1, wherein a flow rate of the oxidizing gas at a pressure of about 1.1 bar lies in the range of 500 to 1000 liters per hour and per kg of particulate activated coal-supported PGM catalyst.

14. The process of claim 1, wherein the oxidizing gas is air or oxygen-enriched air with an oxygen content of up to 50 vol.-%.

15. The process of claim 1, wherein the incineration is performed at an incineration temperature in the range of 600 to 850° C.

* * * * *